US010683826B2

(12) United States Patent
Satake et al.

(10) Patent No.: US 10,683,826 B2
(45) Date of Patent: Jun. 16, 2020

(54) FUEL INJECTION CONTROL DEVICE

(71) Applicant: TOYOTA JIDOSHA KABUSHIKI KAISHA, Toyota-shi, Aichi-ken (JP)

(72) Inventors: Nobuyuki Satake, Kariya (JP); Eiji Murase, Nagoya (JP); Tomohiro Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 16/092,940

(22) PCT Filed: Apr. 7, 2017

(86) PCT No.: PCT/JP2017/014471
§ 371 (c)(1),
(2) Date: Oct. 11, 2018

(87) PCT Pub. No.: WO2017/191728
PCT Pub. Date: Nov. 9, 2017

(65) Prior Publication Data
US 2019/0136789 A1 May 9, 2019

(30) Foreign Application Priority Data
May 6, 2016 (JP) .................................. 2016-093315

(51) Int. Cl.
*F02D 41/40* (2006.01)
*F02D 41/20* (2006.01)
(Continued)

(52) U.S. Cl.
CPC ........... *F02D 41/401* (2013.01); *F02D 41/20* (2013.01); *F02D 41/247* (2013.01);
(Continued)

(58) Field of Classification Search
CPC .... F02D 41/401; F02D 41/402; F02D 41/403; F02D 41/405; F02D 2041/2055; F02M 57/005
See application file for complete search history.

(56) References Cited

U.S. PATENT DOCUMENTS

2002/0152744 A1* 10/2002 Kawatani .............. F02D 41/024
60/286
2016/0177855 A1* 6/2016 Kusakabe .......... F02M 51/0685
123/490
(Continued)

FOREIGN PATENT DOCUMENTS

WO 2013/191267 A1 12/2013
WO 2017/191729 A1 11/2017
(Continued)

OTHER PUBLICATIONS

Apr. 11, 2019 Office Action issued in European Patent Application No. 17 792 661.5.
Jun. 27, 2017 International Search Report issued in International Patent Application No. PCT/JP2017/014471.
Jun. 27, 2017 Written Opinion issued in International Patent Application No. PCT/JP2017/014471.

*Primary Examiner* — Sizo B Vilakazi
*Assistant Examiner* — Anthony L Bacon
(74) *Attorney, Agent, or Firm* — Oliff PLC

(57) ABSTRACT

A fuel injection control device includes a valve closing detection unit to detect a valve closing timing by using either of an electromotive force quantity detection mode and an timing detection mode and a selection unit to select either of the electromotive force quantity detection mode and the timing detection mode for detecting the valve closing timing, and the selection unit: selects the timing detection mode when a requested injection quantity is larger than a prescribed reference injection quantity in partial lift injection;
(Continued)

and selects the electromotive force quantity detection mode when the requested injection quantity is smaller than the reference injection quantity.

5 Claims, 7 Drawing Sheets

(51) Int. Cl.
    *F02D 41/24*     (2006.01)
    *F02M 51/06*     (2006.01)

(52) U.S. Cl.
    CPC . *F02M 51/0614* (2013.01); *F02D 2041/2051* (2013.01); *F02D 2041/2055* (2013.01); *F02D 2041/2058* (2013.01); *F02D 2200/063* (2013.01); *F02D 2200/0614* (2013.01); *F02M 51/0685* (2013.01); *Y02T 10/44* (2013.01)

(56) References Cited

U.S. PATENT DOCUMENTS

| | | | |
|---|---|---|---|
| 2016/0237937 A1* | 8/2016 | Kusakabe | F02D 41/20 |
| 2016/0245211 A1 | 8/2016 | Katsurahara et al. | |
| 2016/0252035 A1 | 9/2016 | Katsurahara et al. | |
| 2016/0252037 A1 | 9/2016 | Katsurahara | |
| 2017/0218876 A1* | 8/2017 | Kusakabe | F02D 41/34 |

FOREIGN PATENT DOCUMENTS

| | | |
|---|---|---|
| WO | 2017/191730 A1 | 11/2017 |
| WO | 2017/191731 A1 | 11/2017 |
| WO | 2017/191732 A1 | 11/2017 |
| WO | 2017/191733 A1 | 11/2017 |

\* cited by examiner

FUEL INJECTION CONTROL DEVICE

CROSS REFERENCE TO RELATED APPLICATION

This application is based on Japanese Patent Application No. 2016-93315 filed on May 6, 2016, the disclosure of which is incorporated herein by reference.

TECHNICAL FIELD

The present disclosure relates to a fuel injection control device having a fuel injection valve of an electromagnetically driven type.

BACKGROUND ART

A fuel injection control device controls injection through a fuel injection valve of an electromagnetically driven type incorporated in an internal combustion engine. Specifically, a fuel injection control device calculates a requested injection quantity in response to the operational status of an internal combustion engine and conducts a coil by an injection command pulse of a pulse width corresponding to the requested injection quantity. As a result, a magnetic attraction force is generated in the coil, a valve body of a fuel injection valve is driven to valve opening, and a fuel is controlled so as to be injected by the requested injection quantity.

In a fuel injection valve of a direct-injection type that injects a fuel of a high pressure directly into a cylinder however, the linearity of the change characteristic of an actual injection quantity to the pulse width of an injection command pulse tends to deteriorate in a partial lift region. The partial lift region means a region of a partial lift state where an injection command pulse width is short and the lift quantity of a valve body does not reach a full lift position. In such a partial lift region, the variation of the lift quantity of a valve body increases and the variation of an injection quantity tends to increase. If the variation of an injection quantity increases, exhaust emission and drivability may deteriorate undesirably.

In a partial lift region, the variation of the lift quantity of a valve body is large and hence the variation of time from the start of valve closing to the finish of the valve closing is also large. When the timing of valve closing by a valve body can be detected in a partial lift region however, deviation between an injection command pulse from a fuel injection control device and actual valve behavior can be recognized by the fuel injection control device. Consequently, it is possible to correct an injection command pulse on the basis of the deviation and control an injection quantity. A technology of detecting the timing of valve closing is disclosed accordingly.

In a fuel injection valve, an induced electromotive force is generated in a coil in proportion to the displacement of a valve body after an injection command pulse is turned off. Since a terminal voltage of the fuel injection valve varies by the generated induced electromotive force therefore, the induced electromotive force can be detected. Two modes of detecting the timing of valve closing by using such an induced electromotive force generated in a coil are disclosed. In Patent Literature 1, as the detection of an induced electromotive force quantity, the difference of an induced electromotive force quantity generated during valve closing caused by the difference of a lift quantity is detected. In Patent Literature 2, as timing detection, an inflection point of an induced electromotive force responding to the drive variation of a movable core after a valve body is seated is detected by using a terminal voltage.

PRIOR ART LITERATURES

Patent Literature

Patent Literature 1: JP2015-96720A
Patent Literature 2: WO2013/191267A

SUMMARY OF INVENTION

When induced electromotive force quantity detection and timing detection are compared, the detection range in the induced electromotive force quantity detection is wider. In the timing detection, a lift quantity of a certain extent is required for generating an inflection point and hence a timing of valve closing cannot be detected by the timing detection when the lift quantity is small.

Further, when induced electromotive force quantity detection and timing detection are compared, the detection accuracy in the timing detection is superior. In the induced electromotive force quantity detection, an electromotive force quantity tends to be influenced by external disturbance and hence the detection accuracy may deteriorate undesirably. In the timing detection, an inflection point is detected and hence the detection accuracy is superior.

In this way, when induced electromotive force quantity detection and timing detection are compared, they have advantages and disadvantages respectively and hence it is desirable to detect a timing of valve closing by both of the detection modes. In order to execute both of the detection modes however, processing capabilities have to be increased and the implementation scale of a control device may increase undesirably.

An object of the present disclosure is to provide a fuel injection control device capable of securing both of detection accuracy and detection range while the upsizing of the control device is suppressed.

According to an aspect of the present disclosure, the fuel injection control device includes a valve closing detection unit to detect a valve closing timing by using either of an electromotive force quantity detection mode and a timing detection mode, and a selection unit to select either of the electromotive force quantity detection mode and the timing detection mode for detecting the valve closing timing. The selection unit selects the timing detection mode when a requested injection quantity is larger than a prescribed reference injection quantity in the partial lift injection. The selection unit selects the electromotive force quantity detection mode when the requested injection quantity is smaller than the reference injection quantity.

According to the present disclosure, the valve closing detection unit can execute either of the induced electromotive force quantity detection mode and the timing detection mode. Consequently, the valve closing detection unit can be downsized further than a configuration of executing both of the modes simultaneously. Further, the selection unit selects the timing detection mode when the requested injection quantity is larger than the reference injection quantity and selects the electromotive force quantity detection mode when the requested injection quantity is smaller than the reference injection quantity. The timing detection mode is superior to the electromotive force quantity detection mode in detection accuracy but has a detection range smaller than the electromotive force quantity detection mode. In the case of the reference injection quantity or more that is in the detection range of being detectable by the timing detection mode therefore, it is possible to select the timing detection mode and use the timing detection mode suitably. Further, in the case of less than the reference injection quantity that is in the detection range of not being detectable by the timing detection mode, the electromotive force quantity detection mode is selected. Consequently, the electromotive force quantity detection mode can make up for the narrow detection range of the timing detection mode. As a result, a fuel injection device that can secure both of the detection accuracy and the detection range of a valve closing timing can be materialized.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

First Embodiment

Figure 1:
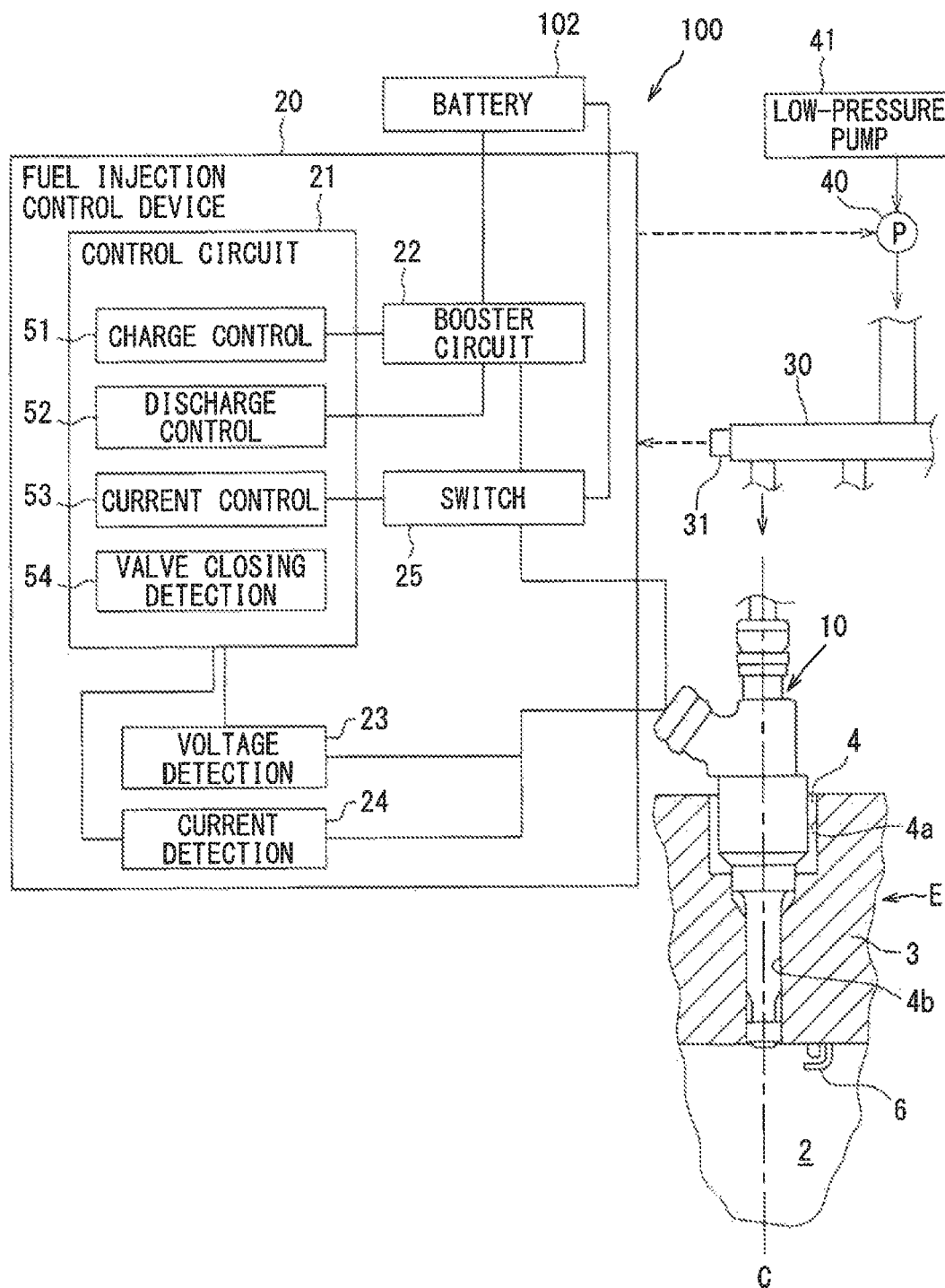
FIG. 1 is a view showing a fuel injection system according to a first embodiment.

A first embodiment according to the present disclosure is explained in reference to FIGS. 1 to 7. A fuel injection system 100 shown in FIG. 1 includes a plurality of fuel injection valves 10 and a fuel injection control device 20. The fuel injection control device 20 controls the opening and closing of the fuel injection valves 10 and controls fuel injection into a combustion chamber 2 of an internal combustion engine E. The fuel injection valves 10: are installed in an internal combustion engine E of an ignition type, for example a gasoline engine; and inject a fuel directly into a plurality of combustion chambers 2 of the internal combustion engine E respectively. A mounting hole 4 penetrating concentrically with an axis C of a cylinder is formed in a cylinder head 3 constituting the combustion chamber 2. A fuel injection valve 10 is inserted into and fixed to the mounting hole 4 so that the tip may be exposed into the combustion chamber 2.

A fuel supplied to the fuel injection valve 10 is stored in a fuel tank not shown in the figure. The fuel in the fuel tank is pumped up by a low-pressure pump 41, the fuel pressure is raised by a high-pressure pump 40, and the fuel is sent to a delivery pipe 30. The high-pressure fuel in the delivery pipe 30 is distributed and supplied to the fuel injection valve 10 of each cylinder. A spark plug 6 is attached to a position of the cylinder head 3 facing the combustion chamber 2. Further, the spark plug 6 is arranged in a vicinity of the tip of the fuel injection valve 10.

Figure 2:
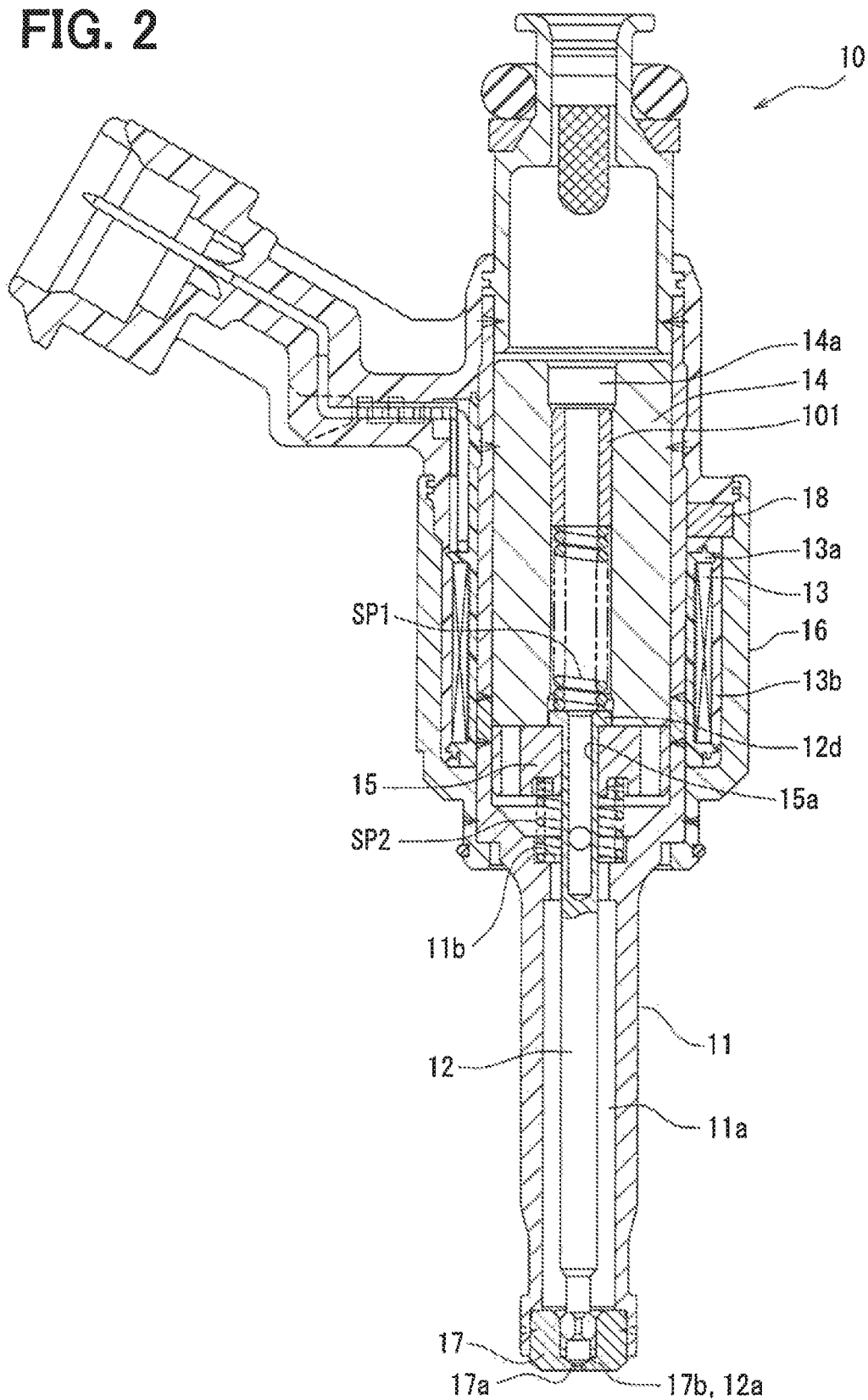
FIG. 2 is a sectional view showing a fuel injection valve.

The configuration of the fuel injection valve 10 is explained hereunder in reference to FIG. 2. As shown in FIG. 2, the fuel injection valve 10 includes a body 11, a valve body 12, a drive coil 13, a stator core 14, a movable core 15, and a housing 16. The body 11 comprises a magnetic material. A fuel passage 11a is formed in the interior of the body 11.

Further, the valve body 12 is contained in the interior of the body 11. The valve body 12 comprises a metal material and is formed cylindrically as a whole. The valve body 12 can be displaced reciprocally in an axial direction in the interior of the body 11. The body 11 is configured so as to have an injection hole body 17 in which a valve seat 17b where the valve body 12 is seated and an injection hole 17a to inject a fuel are formed at the tip part.

The injection hole 17a is formed at the tip part of the body 11 inserted into the combustion chamber 2 in the insertion direction. The tip part is formed conically or hemispherically. The injection hole 17a includes a plurality of holes formed radially from the inside toward the outside of the body 11. A fuel of a high pressure is injected into the combustion chamber 2 through the injection hole 17a. The fuel is vaporized by passing through the injection hole 17a and is in the state of being likely to be mixed with air.

The main body part of the valve body 12 has a columnar shape. The tip part of the valve body 12 has a conical shape extending from the tip of the main body part on the side of the injection hole 17a toward the injection hole 17a. The part, which is seated on the valve seat 17b, of the valve body 12 is a seat surface 12a. The seat surface 12a is formed at the tip part of the valve body 12.

When the valve body 12 is operated for valve closing so as to seat the seat surface 12a on the valve seat 17b, fuel injection from the injection hole 17a is stopped. When the valve body 12 is operated for valve opening so as to separate the seat surface 12a from the valve seat 17b, a fuel is injected through the injection hole 17a.

The drive coil 13 is an actuator and gives a magnetic attraction force to the movable core 15 in a valve opening direction. The drive coil 13 is configured by being wound around a resin-made bobbin 13a and is sealed by the bobbin 13a and a resin material 13b. In other words, a coil body of a cylindrical shape includes the drive coil 13, the bobbin 13a, and the resin material 13b. The bobbin 13a is inserted over the outer peripheral surface of the body 11.

The stator core 14 is a stator and is fixed to the body 11. The stator core 14 comprises a magnetic material and is formed cylindrically. A fuel passage 14a is formed in the interior of the cylinder of the stator core 14. The stator core 14 is inserted at a position opposite to the bobbin 13a over the inner peripheral surface of the body 11.

Further, the outer peripheral surface of the resin material 13b to seal the drive coil 13 is covered with the housing 16. The housing 16 comprises a metallic magnetic material and is formed cylindrically. A lid member 18 comprising a metallic magnetic material is attached to an opening end part of the housing 16. Consequently, the coil body is surrounded by the body 11, the housing 16, and the lid member 18.

The movable core 15 is a mover and is retained by the valve body 12 relatively displaceably in the direction of driving the valve body 12. The movable core 15 comprises a metallic magnetic material, is formed discoidally, and is inserted over the inner peripheral surface of the body 11. The body 11, the valve body 12, the coil body, the stator core 14, the movable core 15, and the housing 16 are arranged so that the center lines of them may coincide with each other. Then the movable core 15 is arranged on the side of the stator core 14 closer to the injection hole 17a and faces the stator core 14 in the manner of having a prescribed gap from the stator core 14 when the drive coil 13 is not conducted.

The body 11, the housing 16, the lid member 18, and the stator core 14, which surround the coil body: comprise magnetic materials as stated earlier; and hence form a magnetic circuit acting as a pathway of a magnetic flux generated when the drive coil 13 is conducted.

As shown in FIG. 1, the outer peripheral surface of a part of the body 11 located on the side closer to the injection hole 17a than the housing 16 is in contact with an inner peripheral surface 4b of the mounting hole 4 on the lower side. Further, the outer peripheral surface of the housing 16 forms a gap from an inner peripheral surface 4a of the mounting hole 4 on the upper side.

A through hole 15a is formed in the movable core 15 and, by inserting the valve body 12 into the through hole 15a, the valve body 12 is assembled to the movable core 15 slidably and relatively movably. A locking part 12d formed by expanding the diameter from the main body part is formed at an end part, which is located on the upper side in FIG. 2, of the valve body 12 on the side opposite to the injection hole. When the movable core 15 is attracted by the stator core 14 and moves upward, the locking part 12d moves in the state of being locked to the movable core 15 and hence the valve body 12 also moves in response to the upward movement of the movable core 15. Even in the state of bringing the movable core 15 into contact with the stator core 14, the valve body 12 can move relatively to the movable core 15 and can lift up.

A main spring SP1 is arranged on the side of the valve body 12 opposite to the injection hole and a sub spring SP2 is arranged on the side of the movable core 15 closer to the injection hole 17a. The main spring SP1 and the sub spring SP2 are coil-shaped and deform resiliently in an axial direction. A resilient force of the main spring SP1 is given to the valve body 12 in the direction of valve closing that is the downward direction in FIG. 2 as a counter force coming from an adjustment pipe 101. A resilient force of the sub spring SP2 is given to the movable core 15 in the direction of attracting the movable core 15 as a counter force coming from a recess 11b of the body 11.

In short, the valve body 12 is interposed between the main spring SP1 and the valve seat 17b and the movable core 15 is interposed between the sub spring SP2 and the locking part 12d. Then the resilient force of the sub spring SP2 is transferred to the locking part 12d through the movable core 15 and is given to the valve body 12 in the direction of valve opening. It can also be said therefore that a resilient force obtained by subtracting a sub resilient force from a main resilient force is given to the valve body 12 in the direction of valve closing.

Here, the pressure of a fuel in the fuel passage 11a is applied to the whole surface of the valve body 12 but a force of pushing the valve body 12 toward the valve closing side is larger than a force of pushing the valve body 12 toward the valve opening side. The valve body 12 therefore is pushed by the fuel pressure in the direction of valve closing. During valve closing, the fuel pressure is not applied to the surface of a part of the valve body 12 located on the downstream side of the seat surface 12a. Then along with valve opening, the pressure of a fuel flowing into the tip part increases gradually and a force of pushing the tip part toward valve opening side increases. The fuel pressure in the vicinity of the tip part therefore increases in accordance with the valve opening and resultantly the fuel pressure valve closing force decreases. For the above reason, the fuel pressure valve closing force is maximum during valve closing and reduces gradually as the degree of the movement of the valve body 12 toward valve opening increases.

The behavior of the drive coil 13 by conduction is explained hereunder. When the drive coil 13 is conducted and an electromagnetic attraction force is generated in the stator core 14, the movable core 15 is attracted toward the stator core 14 by the electromagnetic attraction force. The electromagnetic attraction force is also called an electromagnetic force. As a result, the valve body 12 connected to the movable core 15 operates for valve opening against the resilient force of the main spring SP1 and the fuel pressure valve closing force. On the other hand, when the conduction of the drive coil 13 is stopped, the valve body 12 operates for valve closing together with the movable core 15 by the resilient force of the main spring SP1.

The configuration of the fuel injection control device 20 is explained hereunder. The fuel injection control device 20 is operated by an electronic control unit (called ECU for short). The fuel injection control device 20 includes a control circuit 21, a booster circuit 22, a voltage detection unit 23, a current detection unit 24, and a switch unit 25. The control circuit 21 is also called a microcomputer. The fuel injection control device 20 receives information from various sensors. For example, a fuel pressure supplied to the fuel injection valve 10 is detected by a fuel pressure sensor 31 attached to the delivery pipe 30 and the detection result is given to the fuel injection control device 20 as shown in FIG. 1. The fuel injection control device 20 controls the drive of the high-pressure pump 40 on the basis of the detection result of the fuel pressure sensor 31.

The control circuit 21 includes a central processing unit, a non-volatile memory (ROM), a volatile memory (RAM), and the like and calculates a requested injection quantity and a requested injection start time of a fuel on the basis of a load and a machine rotational speed of an internal combustion engine E. The storage mediums such as a ROM and a RAM are non-transitive tangible storage mediums to non-temporarily store programs and data that are readable by a computer. The control circuit 21: functions as an injection control unit; tests and stores an injection characteristic showing a relationship between a conduction time Ti and an injection quantity Q in the ROM beforehand; controls the conduction time Ti to the drive coil 13 in accordance with the injection characteristic; and thus controls the injection quantity Q. The conduction time Ti to the drive coil 13 is a pulse width of an injection command pulse and is also called an injection command pulse width Ti.

The voltage detection unit 23 and the current detection unit 24 detect a voltage and an electric current applied to the drive coil 13 and give the detection results to the control circuit 21. The voltage detection unit 23 detects a minus terminal voltage of the drive coil 13. The voltage detection unit 23 detects the variation of an induced electromotive force caused by intercepting the electric current supplied to the drive coil 13 and displacing the valve body 12 and the movable core 15 in the valve closing direction as a voltage value. Further, the voltage detection unit 23 detects the variation of an induced electromotive force caused by displacing the movable core 15 relatively to the valve body 12 after the valve seat 17b comes into contact with the valve body 12 as a voltage value. A valve closing detection unit 54 detects a valve closing timing when the valve body 12 operates for valve closing by using a detected voltage.

The control circuit 21 has a charge control unit 51, a discharge control unit 52, a current control unit 53, and the valve closing detection unit 54. Those circuits operate on the basis of an injection command signal outputted from the control circuit 21. The injection command signal is a signal to command a state of conducting the drive coil 13 of the fuel injection valve 10 and is set by using a requested injection quantity and a requested injection start time. The injection command signal includes an injection signal and a boost signal.

The booster circuit 22 applies a boosted boost voltage to the drive coil 13. The booster circuit 22 has a condenser and a switching element and a battery voltage applied from a battery terminal of a battery 102 is boosted by the drive coil 13 and stored in the condenser. The booster circuit 22 controls the timing of boost by the charge control unit 51. Further, the booster circuit 22 controls the timing of discharge by the discharge control unit 52. In this way, a voltage of a boosted and stored electric power corresponds to a boost voltage.

When the discharge control unit 52 turns on a prescribed switching element so that the booster circuit 22 may discharge, a boost voltage is applied to the drive coil 13 of the fuel injection valve 10. The discharge control unit 52 turns off the prescribed switching element of the booster circuit 22 when stopping applying voltage to the drive coil 13.

The current control unit 53 controls on or off of the switch unit 25 and controls the electric current flowing in the drive coil 13 by using a detection result of the current detection unit 24. The switch unit 25 applies a battery voltage or a boost voltage from the booster circuit 22 to the drive coil 13 in an on state and stops the application in an off state. The current control unit 53, at a voltage application start time commanded by an injection command signal for example: turns on the switch unit 25; applies a boost voltage; and starts conduction. Then a coil current increases in accordance with the start of the conduction. Then the current control unit 53 turns off the conduction when a detected coil current value reaches a target value on the basis of a detection result of the current detection unit 24. In short, the current control unit 53 controls a coil current so as to be raised to a target value by applying a boost voltage through initial conduction. Further, the current control unit 53 controls conduction by a battery voltage so that a coil current may be maintained at a value lower than a target value after a boost voltage is applied.

Figure 3:
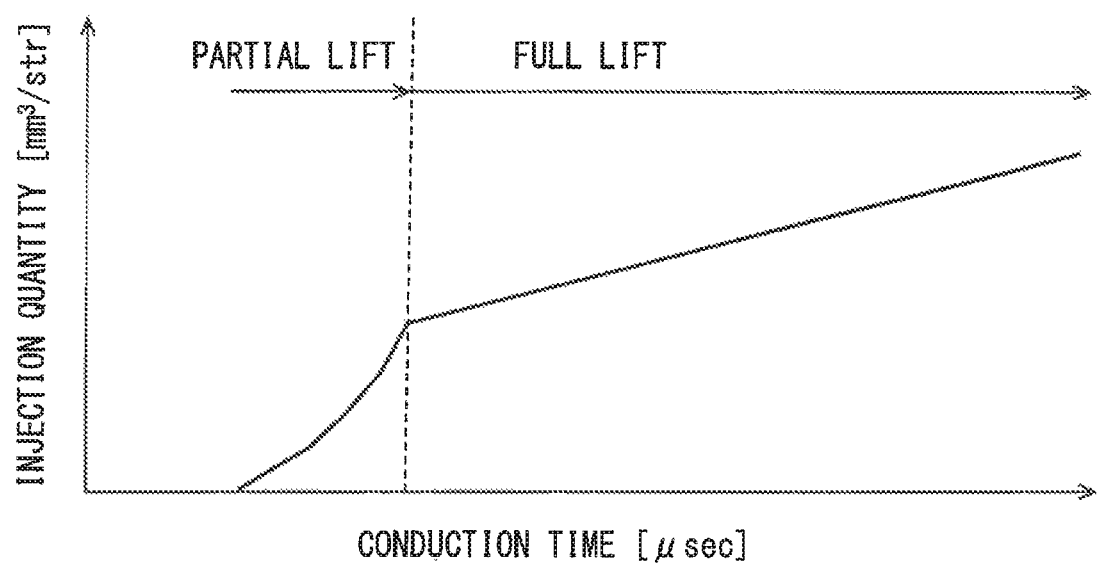
FIG. 3 is a graph showing a relationship between a conduction time and an injection quantity.

As shown in FIG. 3, in a full lift region where an injection command pulse width is comparatively long, the lift quantity of the valve body 12 reaches a full lift position, namely a position where the movable core 15 abuts on the linking part 12d. In a partial lift region where an injection command pulse width is comparatively short however, a partial lift state where the lift quantity of the valve body 12 does not reach a full lift position, namely a state before the movable core 15 abuts on the linking part 12d, is caused.

The fuel injection control device 20, in a full lift region, executes full lift injection of driving the fuel injection valve 10 for valve opening by an injection command pulse allowing the lift quantity of the valve body 12 to reach a full lift position. Further, the fuel injection control device 20, in a partial lift region, executes partial lift injection of driving the fuel injection valve 10 for valve opening by an injection command pulse causing a partial lift state where the lift quantity of the valve body 12 does not reach a full lift position.

Figure 4:
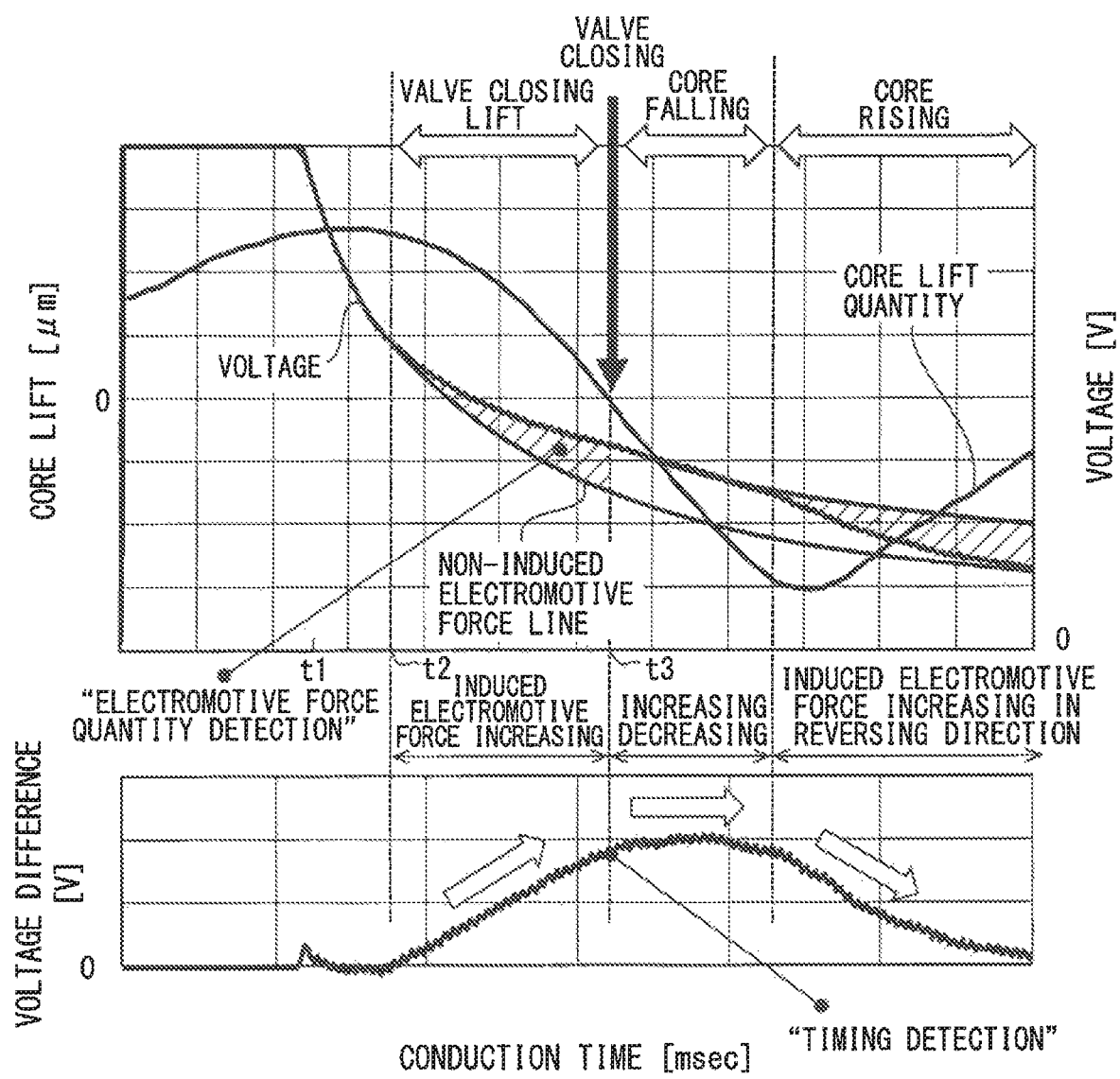
FIG. 4 is a graph showing the behavior of a valve body.

A detection mode of the valve closing detection unit 54 is explained hereunder in reference to FIG. 4. The graph at the upper part in FIG. 4 shows a waveform of minus terminal voltage of the drive coil 13 after conduction is switched from on to off and enlargedly shows a waveform of flyback voltage when conduction is switched off. The flyback voltage is a negative value and hence is shown upside down in FIG. 4. In other words, a waveform of voltage obtained by reversing the positive and negative is shown in FIG. 4.

The valve closing detection unit 54: can execute an electromotive force quantity detection mode and a timing detection mode; and detects a valve closing timing when the valve body 12 shifts to valve closing by using either of the detection modes. The electromotive force quantity detection mode detects a valve closing timing by comparing an accumulated quantity of voltage values detected by the voltage detection unit 23 and a prescribed reference quantity in order to detect a valve closing timing in partial lift injection. The timing detection mode detects an inflection point of voltage values detected by the voltage detection unit 23 as a valve closing timing.

Firstly, the electromotive force quantity detection mode is explained. In the fuel injection valve 10, as shown in FIG. 4, a minus terminal voltage varies by an induced electromotive force after the time t1 when an injection command pulse is switched off. When a waveform of detected electric power and a waveform of no induced electromotive force are compared, it is obvious that a voltage increases to the extent of the induced electromotive force in the waveform of the detected electric power value as shown with the oblique lines in FIG. 4. An induced electromotive force is generated when the movable core 15 passes through a magnetic field during the time from the start of valve closing to the finish of valve closing. Since the change rate of the valve body 12 and the change rate of the movable core 15 vary comparatively largely and the change characteristic of a minus terminal voltage varies at the valve closing timing of the valve body 12, a voltage inflection point where the change characteristic of a minus terminal voltage varies appears in the vicinity of the valve closing timing.

By paying attention to such a characteristic, the valve closing detection unit 54 detects a voltage inflection point time as information related to a valve closing timing as follows. The detection of a valve closing timing shown below is executed for each of the cylinders. The valve closing detection unit 54 calculates a first filtered voltage Vsm1 obtained by filtering (smoothing) a minus terminal voltage Vm of the fuel injection valve 10 with a first low-pass filter during the implementation of partial lift injection at least after an injection command pulse of the partial lift injection is switched off. The first low-pass filter uses a first frequency lower than the frequency of a noise component as the cut-off frequency. Further, the valve closing detection unit 54 calculates a second filtered voltage Vsm2 obtained by filtering (smoothing) the minus terminal voltage Vm of the fuel injection valve 10 with a second low-pass filter using a second frequency lower than the first frequency as the cut-off frequency. As a result, the first filtered voltage Vsm1 obtained by removing a noise component from a minus terminal voltage Vm and the second filtered voltage Vsm2 used for voltage inflection point detection can be calculated.

Figure 5:
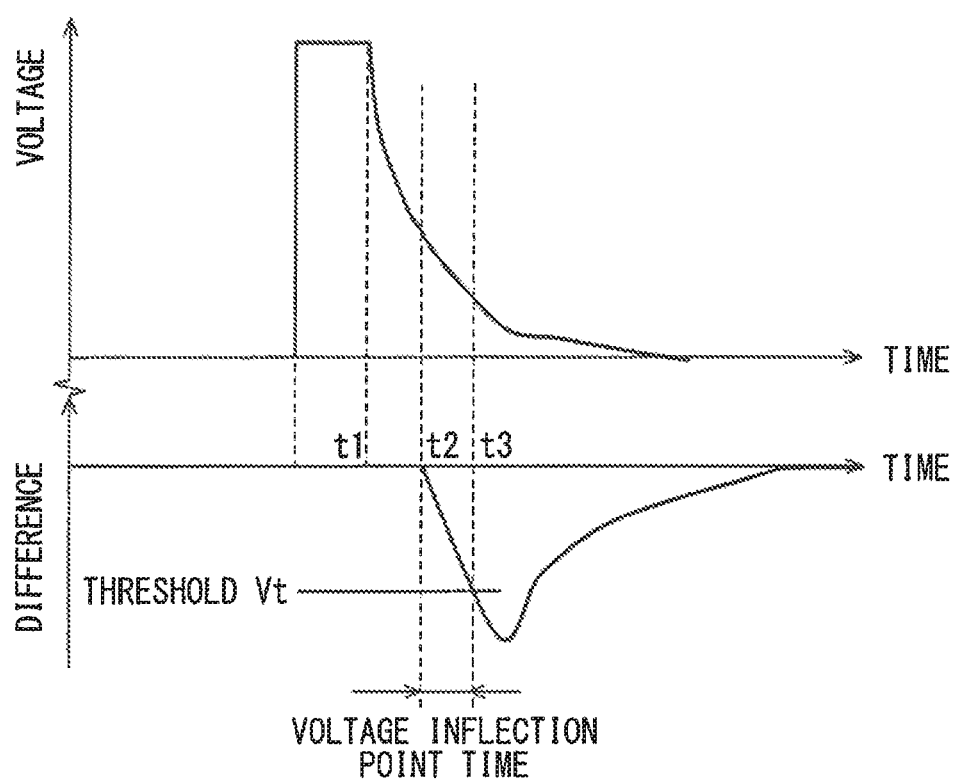
FIG. 5 is a graph showing a relationship between a voltage and a difference.
Figure 6:
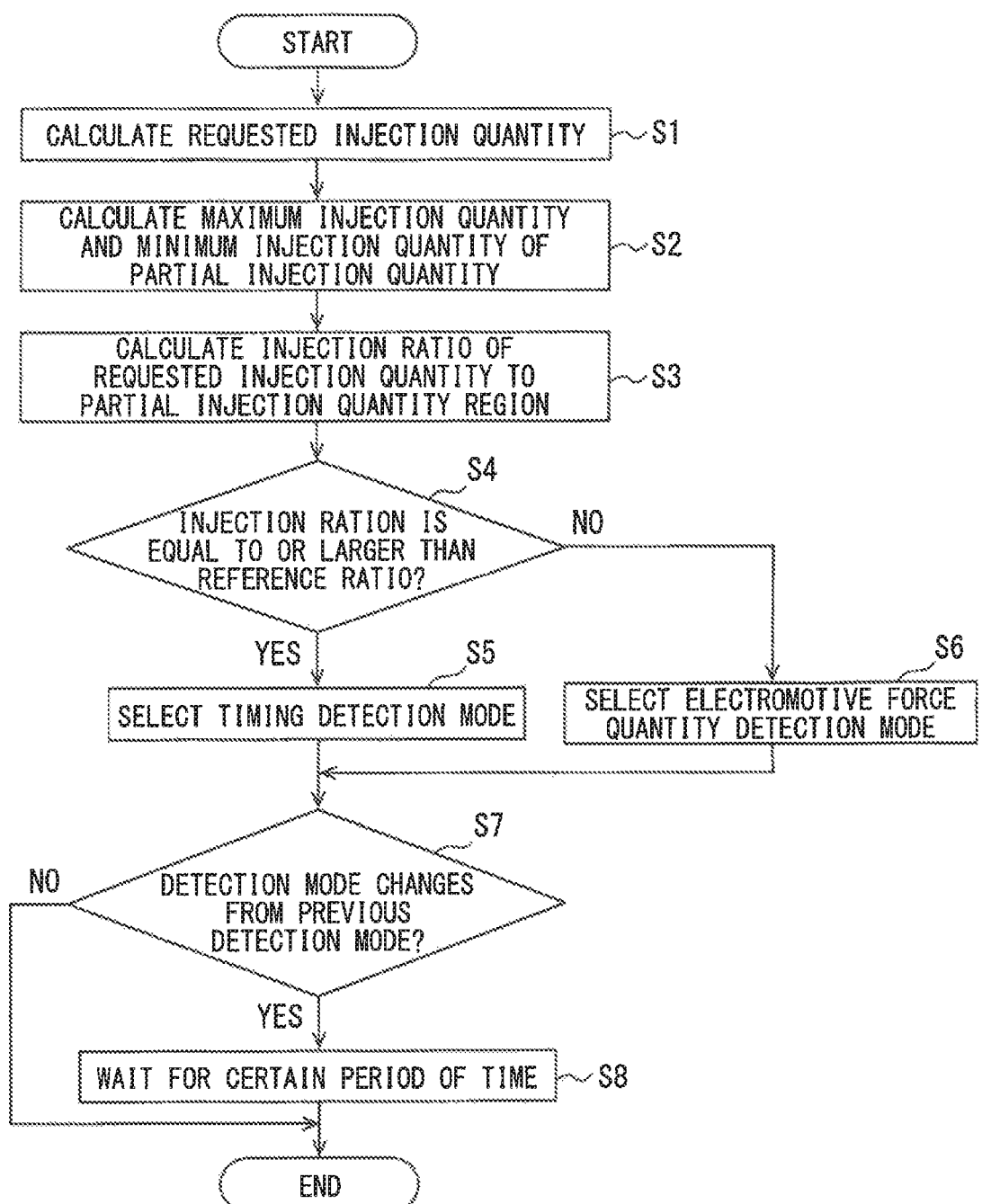
FIG. 6 is a flowchart showing selection processing.

Further, the valve closing detection unit 54 calculates a difference Vdiff (=Vsm1−Vsm2) between the first filtered voltage Vsm1 and the second filtered voltage Vsm2. Furthermore, the valve closing detection unit 54 calculates a time from a prescribed reference timing to a timing when the difference Vdiff comes to be an inflection point as a voltage inflection point time Tdiff. On this occasion, as shown in FIG. 5, the voltage inflection point time Tdiff is calculated by regarding a timing when the difference Vdiff exceeds a prescribed threshold value Vt as a timing when the difference Vdiff comes to be an inflection point. In other words, a time from a prescribed reference timing to a timing when a difference Vdiff exceeds a prescribed threshold value Vt is calculated as the voltage inflection point time Tdiff. The difference Vdiff corresponds to an accumulated value of induced electromotive forces and the threshold value Vt corresponds to a prescribed reference quantity. As a result, the voltage inflection point time Tdiff that varies in response to the valve closing timing of the fuel injection valve 10 can be calculated with a high degree of accuracy. In the present embodiment, the voltage inflection point time Tdiff is calculated by regarding the reference timing as a time t2 when the difference is generated. The threshold value Vt is a fixed value or a value calculated by the control circuit 21 in response to a fuel pressure, a fuel temperature, and others.

In a partial lift region of the fuel injection valve 10, since an injection quantity varies and also a valve closing timing varies by the variation of a lift quantity of the fuel injection valve 10, there is a correlation between an injection quantity and a valve closing timing of the fuel injection valve 10. Further, since a voltage inflection point time Tdiff varies in response to the valve closing timing of the fuel injection valve 10, there is a correlation between a voltage inflection point time Tdiff and an injection quantity. By paying attention to such correlations, an injection command pulse correction routine is executed by the fuel injection control device 20 and hence an injection command pulse in partial lift injection is corrected on the basis of a voltage inflection point time Tdiff.

The fuel injection control device 20 stores a relationship between a voltage inflection point time Tdiff and an injection quantity Q beforehand in the control circuit 21 for each of a plurality of injection command pulse widths Ti in partial lift injection. Then the control circuit 21 estimates an injection quantity Q corresponding to a calculated voltage inflection point time Tdiff for each of the injection command pulse widths Ti by using a relationship between a voltage inflection point time Tdiff and an injection quantity Q for each of the injection command pulse widths Ti stored in a ROM beforehand.

Further, a relationship between an injection command pulse width Ti and an injection quantity Q is set on the basis of the estimation result. As a result, it is possible to: set a relationship between an injection command pulse width Ti and an injection quantity Q corresponding to a current injection characteristic of the fuel injection valve 10; and correct the relationship between the injection command pulse width Ti and the injection quantity Q. Successively, a requested injection command pulse width Tireq responding to a requested injection quantity Qreq is calculated by using a map defining the relationship between the injection command pulse width Ti and the injection quantity Q.

The timing detection mode is explained hereunder. At a moment when the valve body 12 starts valve closing from a valve opening state and comes into contact with the valve seat 17b, since the movable core 15 separates from the valve body 12, the acceleration of the movable core 15 varies at the moment when the valve body 12 comes into contact with the valve seat 17b. In the timing detection mode, a valve closing timing is detected by detecting the variation of the acceleration of the movable core 15 as the variation of an induced electromotive force generated in the drive coil 13. The variation of the acceleration of the movable core 15 can be detected by a second-order differential value of a voltage detected by the voltage detection unit 23.

Specifically, as shown in FIG. 4, after the conduction to the drive coil 13 is stopped at the time t1, the movable core 15 switches from upward displacement to downward displacement in conjunction with the valve body 12. Then when the movable core 15 separates from the valve body 12 after the valve body 12 shifts to valve closing, a force in the valve closing direction that has heretofore been acting on the movable core 15 through the valve body 12, namely a force caused by a load by the main spring SP1 and a fuel pressure, disappears. A load of the sub spring SP2 therefore acts on the movable core 15 as a force in the valve opening direction. When the valve body 12 reaches a valve closing position and the direction of the force acting on the movable core 15 changes from the valve closing direction to the valve opening direction, the increase of an induced electromotive force that has heretofore been increasing gently reduces and the second-order differential value of a voltage turns downward at the valve closing time t3. By detecting the maximum value of the second-order differential value of a minus terminal voltage by the valve closing detection unit 54, a valve closing timing of the valve body 12 can be detected with a high degree of accuracy.

Similarly to the electromotive force quantity detection mode, there is a correlation between a valve closing time from the stop of conduction to a valve closing timing and an injection quantity. By paying attention to such a correlation, an injection command pulse correction routine is executed by the fuel injection control device 20 and thus an injection command pulse in partial lift injection is corrected on the basis of the valve closing time.

The fuel injection control device 20 stores a relationship between a valve closing time detected by the timing detection mode and an injection quantity Q beforehand in the control circuit 21 for each of a plurality of injection command pulse widths Ti in partial lift injection. Then the control circuit 21 estimates an injection quantity Q corresponding to a calculated valve closing time for each of the injection command pulse widths Ti by using a relationship between a valve closing time and an injection quantity Q for each of the injection command pulse widths Ti stored in a ROM beforehand.

Further, similarly to the electromotive force quantity detection mode stated earlier, a relationship between an injection command pulse width Ti and an injection quantity Q is set on the basis of the estimation result. As a result, similarly to the electromotive force quantity detection mode, it is possible to: set a relationship between an injection command pulse width Ti and an injection quantity Q corresponding to a current injection characteristic of the fuel injection valve 10; and correct the relationship between the injection command pulse width Ti and the injection quantity Q. Successively, a requested injection command pulse width Tireq responding to a requested injection quantity Qreq is calculated by using a map defining the relationship between the injection command pulse width Ti and the injection quantity Q.

Selection processing of selecting a detection mode is explained hereunder. The selection processing is executed repeatedly for a short period of time in the state of the power-up of the control circuit 21.

At S1, a requested injection quantity of a fuel is calculated on the basis of a load and a machine rotational speed of an internal combustion engine E and the process proceeds to S2. At S2, a maximum injection quantity and a minimum injection quantity of a partial injection quantity are calculated and the process proceeds to S3. The partial injection quantity is an injection quantity in a partial lift region. The partial injection quantity varies by the deterioration of the fuel injection valve 10 and the like. Then the deterioration of the fuel injection valve 10 and the like are addressed by reflecting correction ratios to the maximum injection quantity and the minimum injection quantity, those acting as references, namely nominal characteristics. Specifically, at S2, the maximum injection quantity and the minimum injection quantity in partial lift injection are corrected by using a valve closing timing stated earlier.

At S3, an injection ratio of the requested injection quantity to a partial injection quantity region is calculated and the process proceeds to S4. The partial injection quantity region is an injection range between the maximum injection quantity and the minimum injection quantity in partial lift injection. Since the maximum injection quantity and the minimum injection quantity at S2 are post-correction values that have been corrected, the partial injection quantity region can be set with a high degree of accuracy.

At S4, the calculated injection ratio and a prescribed reference ratio are compared and the process proceeds to S5 when the calculated injection ratio is equal to or larger than the reference ratio and to S6 when the calculated injection ratio is not equal to or larger than the reference ratio. The reference ratio is determined preferably so as to have a hysteresis using a first threshold value and a second threshold value smaller than the first threshold value. The value of the reference ratio used at S4 therefore varies by a current detection mode. Specifically, the reference ratio is set at the first threshold value while the electromotive force quantity detection mode is selected and the reference ratio is set at the second threshold value while the timing selection mode is selected.

At S5, since the calculated injection ratio is equal to or larger than the reference ratio, the timing detection mode is selected as the detection mode and the process proceeds to S7. At S6, since the calculated injection ratio is smaller than the reference ratio, the electromotive force quantity detection mode is selected as the detection mode and the process proceeds to S7.

At S7, whether or not a selected detection mode changes from the previous detection mode is determined and the process proceeds to S8 when the selected detection mode changes and to S8 when the selected detection mode does not change. At S8, since the detection mode has changed, the process waits without applying a next detection mode for a certain period of time, for example for one cycle, and the process finishes. When the detection mode is switched in this way, the last detection mode before the switching is maintained until a newly selected detection mode is available. In other words, when a detection mode changes, the detection mode is not switched immediately, is prohibited from being changed for a prescribed period of time, and is switched to a next detection mode after the lapse of the prescribed period of time.

Figure 7:
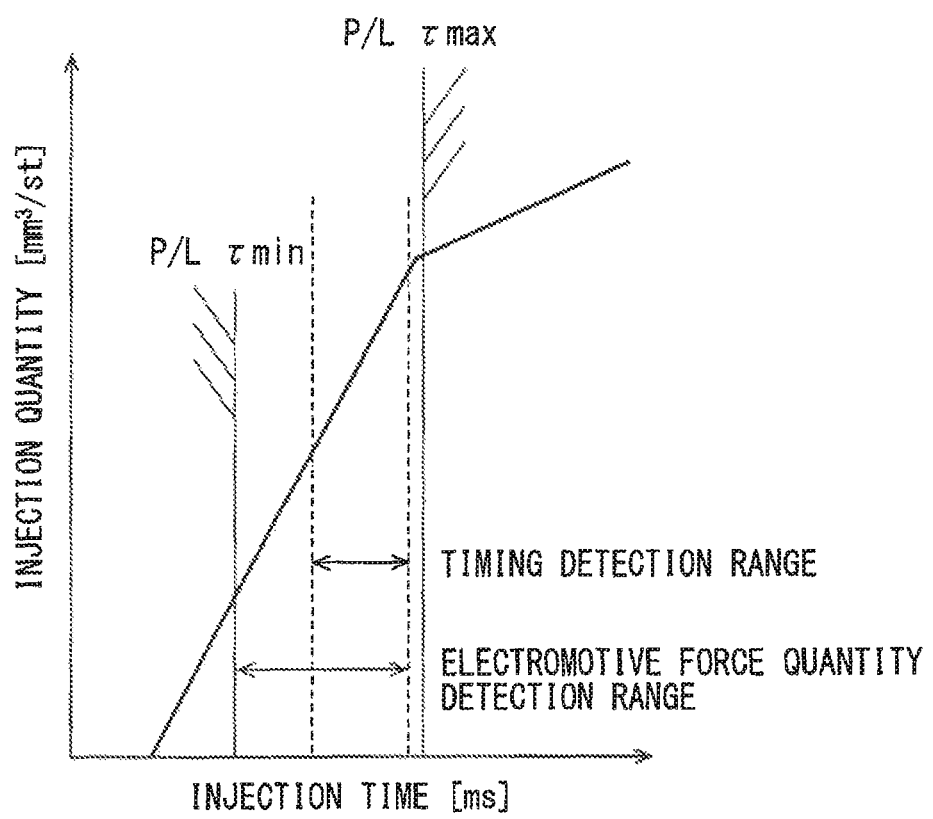
FIG. 7 is a graph for explaining a detection range.

As shown in FIG. 7, an injection time varies in response to a requested injection quantity. Then in a partial lift region, the detection range of the electromotive force quantity detection mode and the detection range of the timing detection mode are different from each other. Specifically, the detection range of the timing detection mode is located on the side where a required injection quantity is larger than a reference ratio in the partial lift region. The electromotive force quantity detection mode covers from a minimum injection quantity τmin to a value in the vicinity of a maximum injection quantity τmax. The detection range of the electromotive force quantity detection mode therefore includes the detection range of the timing detection mode and is wider than the detection range of the timing detection mode. The detection accuracy of a valve closing timing in the timing detection mode however is superior. As explained in FIG. 6 stated earlier therefore, the detection mode is switched on the basis of a requested injection quantity.

As explained above, in the fuel injection control device 20 according to the present embodiment, the valve closing detection unit 54 can execute either of the induced electromotive force quantity detection mode and the timing detection mode. Consequently, the valve closing detection unit 54 can be downsized further than a configuration of executing both of the modes simultaneously. Further, the control circuit 21 functioning as a selection unit selects the timing detection mode when the ratio of a requested injection quantity is equal to or larger than a reference ratio and selects the electromotive force quantity detection mode when the ratio of the requested injection quantity is smaller than a reference ratio. The timing detection mode is superior to the electromotive force quantity detection mode in detection accuracy but has a detection range smaller than the electromotive force quantity detection mode. In the case of a reference ratio or more that is in the detection range of being detectable by the timing detection mode therefore, it is possible to select the timing detection mode and use the timing detection mode suitably. Further, in the case of less than a reference ratio that is in the detection range of not being detectable by the timing detection mode, the electromotive force quantity detection mode is selected. Consequently, the electromotive force quantity detection mode can make up for the narrow detection range of the timing detection mode. As a result, a fuel injection device that can secure both of the detection accuracy and the detection range of a valve closing timing can be materialized.

Further, in the present embodiment, a ratio of a requested injection quantity to a partial injection quantity region and a prescribed reference ratio are compared and a requested injection quantity and a reference injection quantity are not merely compared. A partial injection quantity region changes by time-related deterioration of the fuel injection valve 10 and the like. Even when a partial injection quantity region changes therefore, by not using a fixed value but using a reference ratio, a detection mode can be selected appropriately.

Furthermore, in the present embodiment, a maximum injection quantity and a minimum injection quantity in partial lift injection are post-correction values corrected by using a valve closing timing. Consequently, since the maximum injection quantity and the minimum injection quantity are corrected, a partial injection quantity region can be set with a high degree of accuracy. As a result, the timing detection mode can be selected in an appropriate range.

Moreover, in the present embodiment, a reference ratio is determined so as to have a hysteresis using a first threshold value and a second threshold value. Then the timing detection mode is selected when the ratio of a requested injection quantity is larger than the first threshold value while the electromotive force quantity detection mode is selected. In contrast, the electromotive force quantity detection is selected when the ratio of the requested injection quantity is smaller than the second threshold value while the timing detection mode is selected. When the reference ratio is a single ratio, chattering of frequently switching a detection mode is caused if values in the vicinities of the reference ratio appear frequently. Chattering can be prevented therefore by setting a reference ratio so as to have a hysteresis.

In addition, in the present embodiment, the valve closing detection unit 54, when a detection mode is switched, maintains a previous detection mode until a newly selected detection mode is available. If a detection mode is switched immediately, the detection mode may be switched undesirably in the middle of the detection or the like. In order to prevent switching in the middle of a detection mode therefore, the process waits until a next detection mode is available. In this way, the switching of a detection mode can be executed smoothly.

OTHER EMBODIMENTS

Although preferred embodiments of the present disclosure have been described above, the present disclosure is not limited to the above-described embodiments, and various modifications are contemplated as exemplified below. The present disclosure is intended to cover various modification and equivalent arrangements.

It should be understood that the configurations described in the above-described embodiments are example configurations, and the present disclosure is not limited to the foregoing descriptions. In addition, while the various combinations and configurations, which are preferred, other combinations and configurations, including more, less or only a single element, are also within the spirit and scope of the present disclosure. The scope of the present disclosure encompasses claims and various modifications of claims within equivalents thereof.

Although a detection mode is switched by using a ratio of a requested injection quantity and a reference ratio in the first embodiment stated earlier, the present disclosure is not limited to a configuration of using a reference ratio. For example, it is also possible to switch a detection mode by using a prescribed reference value. Specifically, it is also possible to: select the timing detection mode when a requested injection quantity is larger than a prescribed reference injection quantity in partial lift injection; and select the electromotive force quantity detection mode when the requested injection quantity is smaller than the reference injection quantity. Since a process of calculating a ratio is unnecessary in this way, the calculation load of the control circuit 21 can be reduced.

Although the fuel injection valve 10 is configured so as to have the valve body 12 and the movable core 15 individually in the first embodiment stated earlier, the fuel injection valve 10 may also be configured so as to have the valve body 12 and the movable core 15 integrally. If they are configured integrally, the valve body 12 is displaced together with the movable core 15 in the valve opening direction and shifts to valve opening when the movable core 15 is attracted.

Although the fuel injection valve 10 is configured so as to start the shift of the valve body 12 at the same time as the start of the shift of the movable core 15 in the first embodiment stated earlier, the fuel injection valve 10 is not limited to such a configuration. For example, the fuel injection valve 10 may be configured so that: the valve body 12 may not start valve opening even when the movable core 15 starts shifting; and the movable core 15 may engage with the valve body 12 and start valve opening at the time when the movable core 15 moves by a prescribed distance.

The functions exhibited by the fuel injection control device 20 in the first embodiment stated earlier may be exhibited by hardware and software, those being different from those stated earlier, or a combination of them. The control device for example may communicate with another control device and the other control device may implement a part or the whole of processing. When a control device includes an electronic circuit, the control device may include a digital circuit or an analog circuit including many logic circuits.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A fuel injection control device to control a fuel injection valve including a drive coil to generate an electromagnetic attraction force by being conducted, a movable core to be attracted by the electromagnetic attraction force of the drive coil, and a valve body to separate from a valve seat and open a fuel passage by attracting the movable core from the state of contact with the valve seat and thus closing the fuel passage, the fuel injection control device comprising:
    an injection control unit to execute full lift injection of controlling the drive coil by an injection command pulse allowing a lift quantity of the valve body to reach a full lift position and partial lift injection of controlling the drive coil by an injection command pulse allowing the lift quantity of the valve body not to reach the full lift position;
    a voltage detection unit to detect the change of an induced electromotive force generated in the drive coil by intercepting an electric current supplied to the drive coil and displacing the valve body in the direction of valve closing as a voltage value;
    a valve closing detection unit to detect a valve closing timing by using either of an electromotive force quantity detection mode of detecting the valve closing timing by comparing an accumulated quantity of voltage values detected by the voltage detection unit and a prescribed reference quantity and a timing detection mode of detecting an inflection point of a voltage value detected by the voltage detection unit as a valve closing timing in order to detect the valve closing timing when the valve body shifts to valve closing in the partial lift injection; and
    a selection unit to select either of the electromotive force quantity detection mode and the timing detection mode for detecting the valve closing timing, wherein
    the selection unit
        selects the timing detection mode when a requested injection quantity is larger than a prescribed reference injection quantity in the partial lift injection, and
        selects the electromotive force quantity detection mode when the requested injection quantity is smaller than the reference injection quantity.

2. The fuel injection control device according to claim 1, wherein
    a maximum injection quantity and a minimum injection quantity, acting as references, are set beforehand in the partial lift injection, and
    the selection unit
        compares a ratio of the requested injection quantity to an injection range between the maximum injection quantity and the minimum injection quantity in the partial lift injection and a prescribed reference ratio,
        selects the timing detection mode when the ratio of the requested injection quantity is larger than the reference ratio, and selects the electromotive force quantity detection mode when the ratio of the requested injection quantity is smaller than the reference ratio.

3. The fuel injection control device according to claim 2, wherein the maximum injection quantity and the minimum injection quantity in the partial lift injection are post-correction values corrected by using the valve closing timing.

4. The fuel injection control device according to claim 2, wherein the reference ratio is determined so as to have a hysteresis using a first threshold value and a second threshold value smaller than the first threshold value, and the selection unit selects the timing detection mode when the ratio of the requested injection quantity is larger than the first threshold value while the electromotive force quantity detection mode is selected, and selects the electromotive force quantity detection mode when the ratio of the requested injection quantity is smaller than the second threshold value while the timing detection mode is selected.

5. The fuel injection control device according to claim 1, wherein when the selection unit switches a detection mode, the valve closing detection unit detects the valve closing timing by a detection mode before switching until a prescribed time lapses, and detects the valve closing timing by a detection mode after switching after the prescribed time lapses.

* * * * *